US012462511B2

United States Patent
Rakshit et al.

(10) Patent No.: US 12,462,511 B2
(45) Date of Patent: Nov. 4, 2025

(54) FACTCHECK STREAMING IN VR COLLABORATION

(71) Applicant: INTERNATIONAL BUSINESS MACHINES CORPORATION, Armonk, NY (US)

(72) Inventors: Sarbajit K. Rakshit, Kolkata (IN); Sathya Santhar, Ramapuram (IN); Sridevi Kannan, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 150 days.

(21) Appl. No.: 18/435,008

(22) Filed: Feb. 7, 2024

(65) Prior Publication Data
US 2025/0252694 A1    Aug. 7, 2025

(51) Int. Cl.
  *G06T 19/00*  (2011.01)
  *G06F 40/109*  (2020.01)
  (Continued)

(52) U.S. Cl.
  CPC ............ *G06T 19/20* (2013.01); *G06F 40/109* (2020.01); *G06T 11/001* (2013.01); *G06T 13/40* (2013.01);
  (Continued)

(58) Field of Classification Search
  None
  See application file for complete search history.

(56) References Cited

U.S. PATENT DOCUMENTS 10,562,625 B2   2/2020  Myslinski
2017/0019535 A1  1/2017  Bostick
(Continued)

FOREIGN PATENT DOCUMENTS

IN   202321034909 A   6/2023

OTHER PUBLICATIONS

Albahar, et al., "Deepfakes: Threats And Countermeasures Systematic Review", Journal of Theoretical and Applied Information Technology, Nov. 30, 2019, vol. 97. No. 22, pp. 3242-3250.
(Continued)

*Primary Examiner* — Martin Mushambo
(74) *Attorney, Agent, or Firm* — Robert R. Aragona

(57) ABSTRACT

An embodiment for factcheck streaming in a virtual reality (VR) collaboration is provided. The embodiment may include receiving a video of a VR collaboration and one or more inputs from a user. The embodiment may also include identifying a pre-determined boundary of the VR collaboration. The embodiment may further include executing a factcheck of one or more items of content. The embodiment may also include identifying at least one factually inaccurate item of content. The embodiment may further include in response to determining the at least one factually inaccurate item of content is able to be replaced, generating, by a pre-trained generative adversarial network (GAN) model, at least one factually accurate item of content. The embodiment may also include replacing the at least one factually inaccurate item of content with the generated at least one factually accurate item of content in the VR collaboration.

20 Claims, 3 Drawing Sheets

(51) Int. Cl.
*G06T 11/00* (2006.01)
*G06T 13/40* (2011.01)
*G06T 19/20* (2011.01)
*G06V 20/40* (2022.01)

(52) U.S. Cl.
CPC ............ *G06T 19/006* (2013.01); *G06V 20/41* (2022.01); *G06T 2219/024* (2013.01)

(56) References Cited

U.S. PATENT DOCUMENTS

2018/0357670 A1* 12/2018 DeLuca ............. G06Q 30/0255
2019/0306174 A1* 10/2019 Jolly ................... H04L 63/1425

OTHER PUBLICATIONS

Fromm, et al., "More than experience?—On the unique opportunities of virtual reality to afford a holistic experiential learning cycle", Elsevier, The Internet and Higher Education 50, Mar. 13, 2021, 14 Pages.

Guan, et al., "Editable video creation based on embedded simulation engine and GAN", Elsevier, Microprocessors and Microsystems 75, Feb. 20, 2020, 7 pages.

India Today, "Fact Check", https://www.indiatoday.in/fact-check/videos, Accessed on Nov. 15, 2023, 13 pages.

Jahnke, et al., "Exploring students' use of online sources in small groups with an augmented reality-based activity—group dynamics negatively affect identification of authentic online information", Elsevier, Jun. 7, 2018, 22 Pages.

Miami Dade College, "Fake News (and how to fight it): Verifying Images & Videos", https://libraryguides.mdc.edu/FakeNews/VerifyingImages, Accessed on Nov. 15, 2023, 3 Pages.

Rai, et al., "Fake News Classification using transformer based enhanced LSTM and BERT", International Journal of Cognitive Computing in Engineering 3, Mar. 15, 2022, 8 Pages.

Smith, "Virtual reality in libraries is common sense", Library Hi Tech News, Emerald Publishing Limited, Nov. 6, 2019, pp. 10-13.

* cited by examiner

FACTCHECK STREAMING IN VR COLLABORATION

BACKGROUND

The present invention relates generally to the field of computing, and more particularly to a system for factcheck streaming in a virtual reality (VR) collaboration.

In a VR collaboration setting, participants typically wear VR headsets or other VR devices to enter a virtual space or room. VR facilitates the communication between individuals who may be physically separated in different geographical locations but nevertheless are virtually connected. In the VR environment, the participants are represented by avatars or other digital representations of themselves, allowing the participants to see and interact with each other within the VR environment. The VR environment may include, but is not limited to, virtual meetings, shared virtual spaces, content sharing and annotation, virtual drawing boards, virtual training, and/or virtual simulations.

SUMMARY

According to one embodiment, a method, computer system, and computer program product for factcheck streaming in a virtual reality (VR) collaboration is provided. The embodiment may include receiving a video of a VR collaboration and one or more inputs from a user relating to the video. The embodiment may also include identifying a pre-determined boundary of the VR collaboration based on the one or more inputs. The embodiment may further include executing a factcheck of one or more items of content within the pre-determined boundary. The embodiment may also include identifying at least one factually inaccurate item of content in the one or more items of content. The embodiment may further include in response to determining the at least one factually inaccurate item of content is able to be replaced with at least one factually accurate item of content, generating, by a pre-trained generative adversarial network (GAN) model, the at least one factually accurate item of content. The embodiment may also include replacing the at least one factually inaccurate item of content with the generated at least one factually accurate item of content in the VR collaboration.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
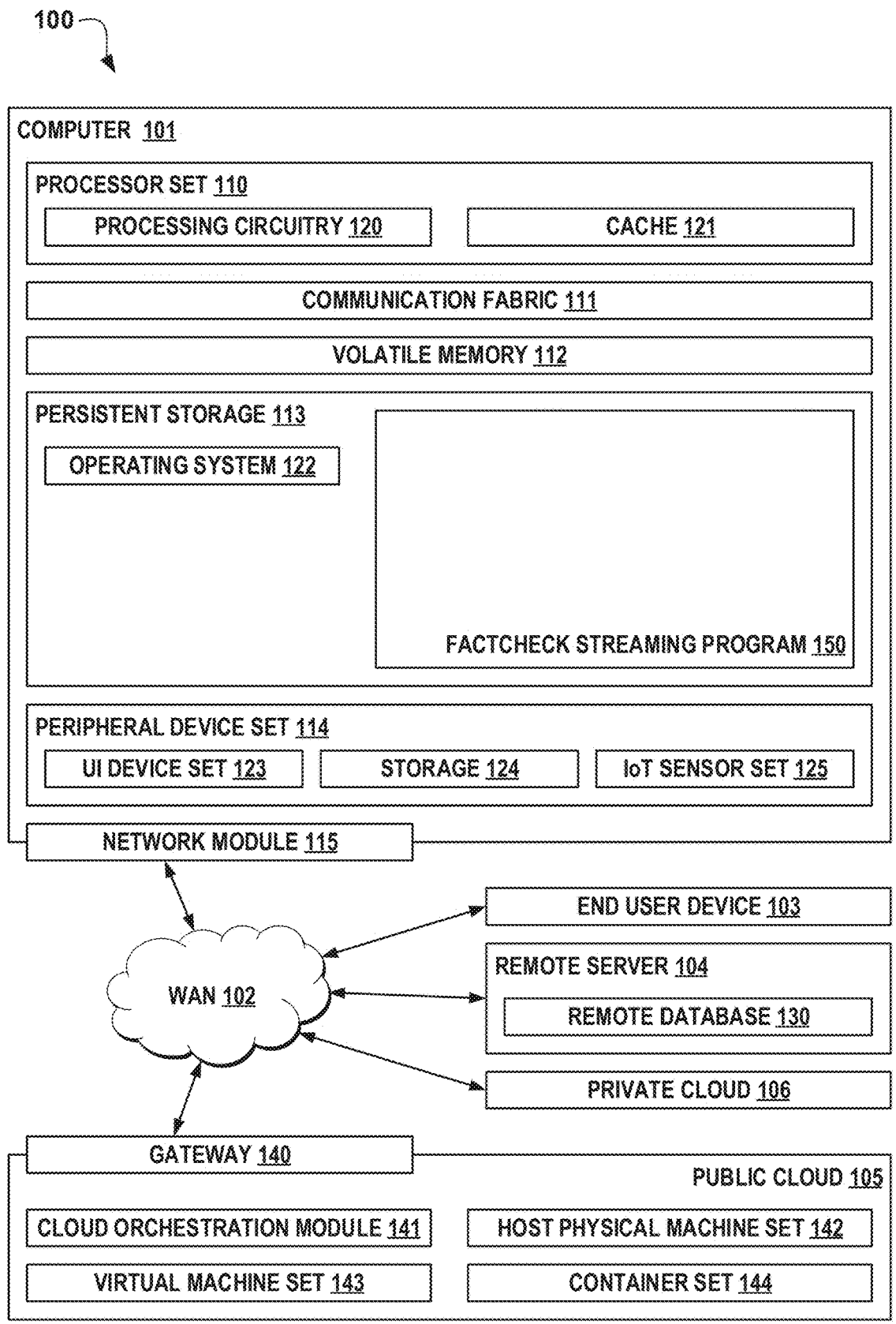
FIG. 1 illustrates an exemplary computing environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for factcheck streaming in a virtual reality (VR) collaboration. The following described exemplary embodiments provide a system, method, and program product to, among other things, execute a factcheck of one or more items of content within a pre-determined boundary and, accordingly, generate, by a pre-trained generative adversarial network (GAN) model, at least one factually accurate item of content. Therefore, the present embodiment has the capacity to improve VR technology by updating frames of the VR collaboration containing false information to contain accurate information.

As previously described, in a VR collaboration setting, participants typically wear VR headsets or other VR devices to enter a virtual space or room. VR facilitates the communication between individuals who may be physically separated in different geographical locations but nevertheless are virtually connected. In the VR environment, the participants are represented by avatars or other digital representations of themselves, allowing the participants to see and interact with each other within the VR environment. The VR environment may include, but is not limited to, virtual meetings, shared virtual spaces, content sharing and annotation, virtual drawing boards, virtual training, and/or virtual simulations. During a VR collaboration, a participant may say or post false information that may be propagated to the other participants. This problem is typically addressed by factchecking during video playback. However, factchecking during video playback fails to factcheck visual aspects of the video.

It may therefore be imperative to have a system in place to factcheck the visual aspects of the video in addition to audio aspects. Thus, embodiments of the present invention may provide advantages including, but not limited to, updating frames of a VR collaboration containing false information to contain accurate information, factchecking the visual aspects of the video in addition to audio aspects, and preventing the propagation of false information. The present invention does not require that all advantages need to be incorporated into every embodiment of the invention.

According to at least one embodiment, when participating in a VR collaboration, a video of a VR collaboration and one or more inputs from a user may be received in order to identify a pre-determined boundary of the VR collaboration based on the one or more inputs. Upon identifying the pre-determined boundary, a factcheck of one or more items of content may be executed within the pre-determined boundary so that at least one factually inaccurate item of content may be identified in the one or more items of content. Then, it may be determined whether the at least one factually inaccurate item of content is able to be replaced with at least one factually accurate item of content. According to at least one embodiment, in response to determining the at least one factually inaccurate item of content is able to be replaced, the at least one factually accurate item of content may be generated, by a pre-trained GAN model, such that the at least one factually inaccurate item of content may be replaced with the generated at least one factually accurate item of content in the VR collaboration.

According to at least one other embodiment, in response to determining the at least one factually inaccurate item of content is not able to be replaced, the at least one factually inaccurate item of content may be removed, by the pre-trained GAN model, from the VR collaboration.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to execute a fact-check of one or more items of content within a pre-determined boundary and, accordingly, generate, by a pre-trained GAN model, at least one factually accurate item of content.

Referring to FIG. 1, an exemplary computing environment 100 is depicted, according to at least one embodiment. Computing environment 100 contains an example of an environment for the execution of at least some of the computer code involved in performing the inventive methods, such as a factcheck streaming program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the factcheck streaming program 150 may be a program capable of receiving a video of a VR collaboration and one or more inputs from a user relating to the video, executing a factcheck of one or more items of content within a pre-determined boundary, generating, by a pre-trained GAN model, at least one factually accurate item of content, updating frames of the VR collaboration containing false information to contain accurate information, factchecking the visual aspects of the video in addition to audio aspects, and preventing the propagation of false information. Furthermore, notwithstanding depiction in computer 101, the factcheck streaming program 150 may be stored in and/or executed by, individually or in any combination, end user device 103, remote server 104, public cloud 105, and private cloud 106. The factcheck streaming method is explained in further detail below with respect to FIG. 2. It may be appreciated that the examples described below are not intended to be limiting, and that in embodiments of the present invention the parameters used in the examples may be different.

Figure 2:
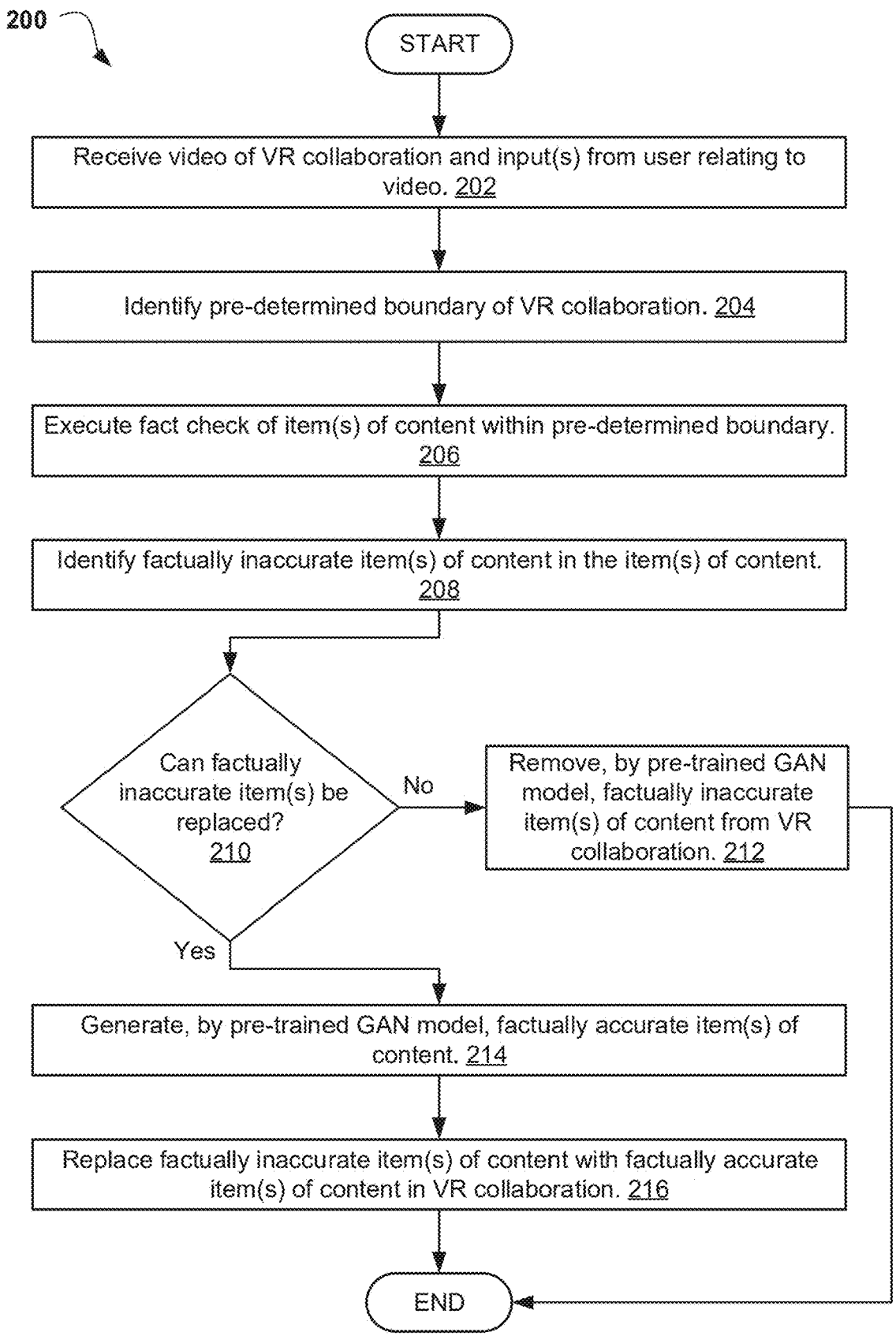
FIG. 2 illustrates an operational flowchart for factcheck streaming in a virtual reality (VR) collaboration in a VR factcheck streaming process according to at least one embodiment.
Figure 3:
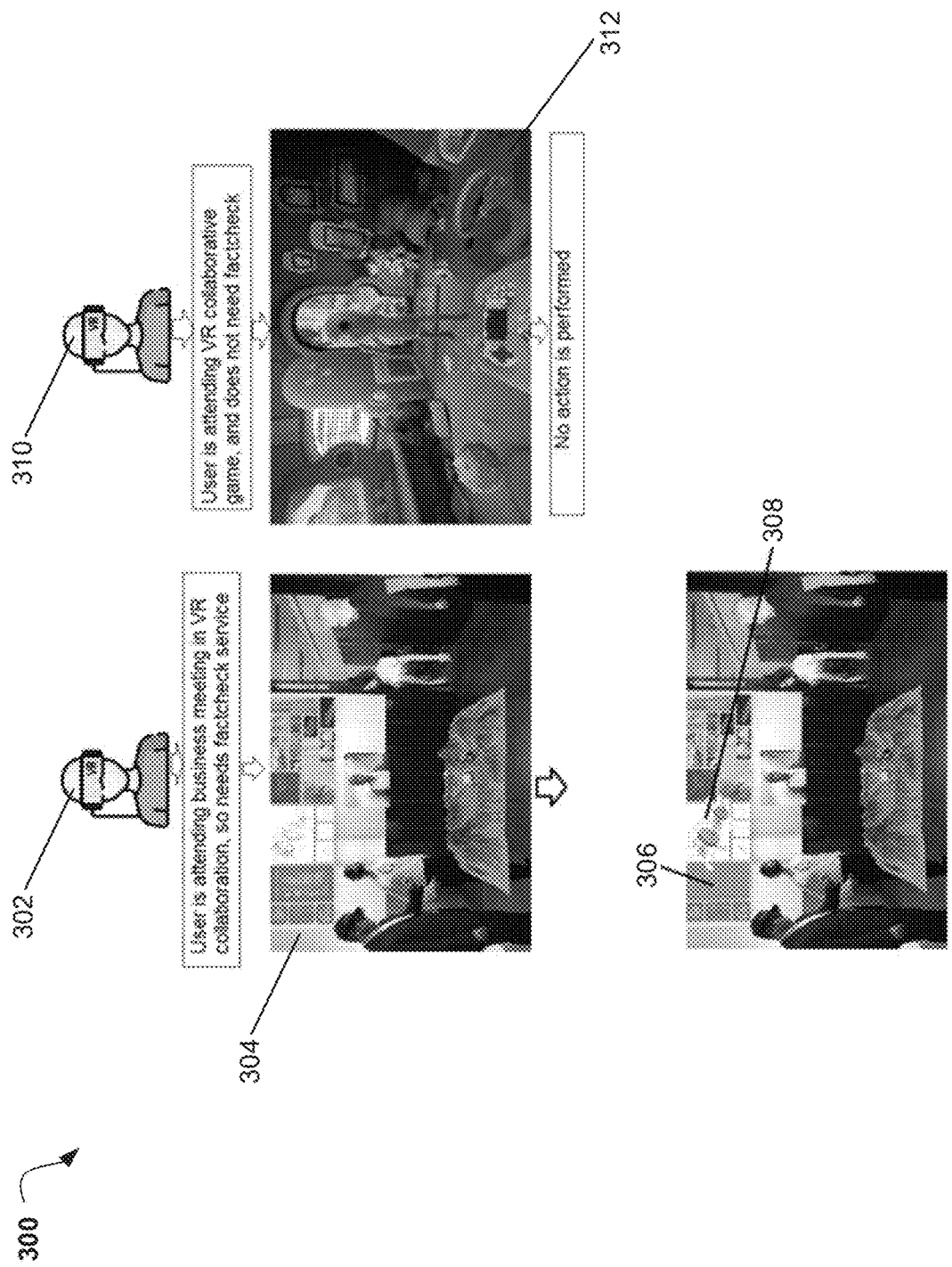
FIG. 3 is an exemplary diagram depicting a first VR collaboration and a second VR collaboration according to at least one embodiment.

Referring now to FIG. 2, an operational flowchart for factcheck streaming in a VR collaboration in a VR factcheck streaming process 200 is depicted according to at least one embodiment. At 202, the factcheck streaming program 150 receives the video of the VR collaboration and the one or more inputs from the user relating to the video. The video may be a video of a VR collaborative meeting or a video of a VR gaming experience, as illustrated in FIG. 3. As used herein, "user" means a participant in the VR collaboration who subscribes to a cloud-hosted factcheck service.

Examples of the input may include, but are not limited to, a subscription to a cloud-hosted factcheck service, an input defining a boundary of the VR collaboration where the factchecking is to be executed, and/or an input defining types of content to factcheck. For example, in the VR gaming experience, the user may not elect to subscribe to the cloud-hosted factcheck service, whereas in the VR collaborative meeting, the user may elect to subscribe to the cloud-hosted factcheck service. In another example, the user may perform a hand gesture to draw a rectangle around a portion of the VR collaboration where the factchecking is to be executed. In a further example, the user may elect to factcheck both audio content (e.g., spoken content) and visual content (e.g., textual content and objects). According to at least one embodiment, a side panel with virtual icons may be displayed in the VR collaborative environment for the user to make one or more selections regarding the one or more inputs.

Then, at 204, the factcheck streaming program 150 identifies the pre-determined boundary of the VR collaboration. The pre-determined boundary is identified based on the one or more inputs. Specifically, the pre-determined boundary is identified based on the input defining the boundary of the VR collaboration where the factchecking is to be executed. For example, as described above with respect to step 202, the user may perform a hand gesture to draw a rectangle around a portion of the VR collaboration where the factchecking is to be executed. The rectangle may include one large rectangle around an area or multiple rectangles around different areas of the VR collaboration. Continuing the example, the user may draw the rectangle around a specific object (e.g., a building) and/or a portion of the viewing area (e.g., the left-half of the VR collaboration).

According to at least one embodiment, identifying the pre-determined boundary may include identifying one or more types of content to factcheck in the VR collaboration based on the one or more inputs. As described above with respect to step 202, the one or more inputs may include the user defining the types of content to factcheck. For example, the user may elect to factcheck both audio content (e.g., spoken content) and visual content (e.g., textual content and objects). These elections may be received by the factcheck streaming program 150.

Next, at 206, the factcheck streaming program 150 executes the factcheck of the one or more items of content within the pre-determined boundary. It may be appreciated that in embodiments of the present invention, the items of content outside the pre-determined boundary may be excluded from the executed factcheck. The factcheck may be executed on a frame-by-frame basis. In this manner, each frame in the video of the VR collaboration may be associated with a factchecking action. For example, the factcheck may be executed on a frame containing an image of a poster.

According to at least one embodiment, the video of the VR collaboration may be split into an audio part and a visual part. The audio part may include spoken content and the audio part may be fed to an automatic speech to text converter, which may convert the input speech to text. An audio signal may be processed to extract acoustic features, such as Mel-frequency cepstral coefficients (MFCCs) or filterbank energies. These acoustic features may capture information about the audio signal, including spectral content and temporal variations. An automatic speech recognition (ASR) model may employ acoustic models based on deep neural networks (DNNs) or recurrent neural networks (RNNs) to learn the relationship between the acoustic features and the corresponding phonetic or linguistic units. These acoustic models may map the acoustic input to a sequence of speech units. For example, the acoustic input may be mapped to phonemes or subword units. A language model may capture the probability distribution of words or linguistic units in a given context, and may assist in resolving ambiguities during decoding. For example, the context of each sentence may be identified (e.g., as a fact or non-fact), and the probability distribution for sentences regarded as facts may place a greater emphasis on words in the sentences regarded as facts. During decoding, the ASR model may generate the most likely transcription for the input speech, which may involve finding the sequence of words or linguistic units that maximizes the joint probability of the acoustic model and the language model. The ASR model may be trained using large datasets of transcribed audio recordings. The ASR model may be optimized by minimizing the difference between the predicted transcriptions and ground truth transcriptions through a technique such as connectionist temporal classification (CTC) loss or sequence-to-sequence models with attention mechanisms. The output text from the ASR model may be tagged as audio.

The visual part of the video may be fed to a you only look once (YOLO) object detection network including two main components: a backbone network and a detection head. The backbone network may be a convolutional neural network (CNN) that processes an input image to extract meaningful features. The backbone network may be based on a pre-trained network such as Darknet, Darknet-19, or Darknet-53. The detection head may generate bounding box predictions and class probabilities. The detection head may take the feature maps from the backbone network and predict objects. The YOLO network may predict bounding boxes relative to each object. Formulas to convert the parameters of the bounding boxes to absolute coordinates may be (bx, by): $bx=\sigma(tx)+cx$, $by=\sigma(t,y)+cy$ which indicates center coordinates of the bounding box and $bw=pw^*exp(tw)$, $bh=ph^*exp(th)$ which indicates the width and height of the bounding box. In the formulas, $\sigma$ denotes the sigmoid function, (tx, ty, tw, th) may be the predicted parameters for the bounding box, (cx, cy) may be the coordinates of the top-left corner of the grid cell, and (ph, py) may be anchor box dimensions of the grid cell. The YOLO network may assign an objectness score to each predicted bounding box, indicating the confidence that the box contains an object, as follows: objectness score=$\sigma$(to) where $\sigma$ denotes the sigmoid function and to is the predicted parameter for the objectness score. For example, on a scale between 0 and 1, 0.9 may indicate the bounding box contains an object with high confidence, 0.5 may indicate the bounding box contains an object with medium confidence, and 0.2 may indicate the bounding box does not contain an object. The YOLO network may then predict the probability distribution of different object classes withing each grid cell as follows:

Class probability=Pr (Class_i|Object)*Objectness score where Pr (Class_i|Object) represents the conditional probability of Class_i given that an object is present in the bounding box. For example, where there are 10 classes, the probability may be the probability the object belongs to a particular class. The YOLO network may be trained using a combination of a labeled training data set and an appropriate loss function. The loss function may incorporate components that measure the localization error (e.g., bounding box regression) and the classification error (e.g., objectness and class probabilities). The YOLO network may output the object class labels as actual visual content or textual content. For example, the object class label may be a living thing or a non-living thing.

According to at least one other embodiment, the visual part may be further split into a non-spoken text part and a visual object part. The factcheck may be executed on the audio part and the visual part separately. Based on the class labels of the YOLO network output, the visual part may be further split into the non-spoken text part and the visual object part. The non-spoken textual content of the video may be tagged as text. The non-spoken textual content and the transcribed spoken content may be may be fed to a video conditioned fact checking natural language processing (NLP) model architecture (e.g., Bidirectional Encoder Representations from Transformers and Long Short-Term Memory) to classify the input text as factually accurate or factually inaccurate. The input text may be pre-processed by tokenizing the input text into individual word or subword units. The tokenized input may then be fed to the BERT model, which processes the text in a bidirectional manner, capturing contextual embeddings for each token. These embeddings encode rich semantic and syntactic information about the words in the input. The LSTM may model the sequential dependencies in the encoded text. A classification layer, such as a softmax layer or a full connected layer, may map the encoded sequence to specific fact-checking labels or truthfulness scores. The model may be trained using labeled data, where the labels indicate the veracity of input statements. The softmax function may be applied to the output of the classification layer to generate probability scores for each class as follows: $P(Class\_i)=exp(score\_i/sum(exp(score\_j))$ where j represents classes, and score i represents the raw score for class i. The entire model may be trained on various reliable text sources to verify the input textual facts. If the input text is classified as real, no changes may be required for the specific text. However, if the input text is classified as fake, the fake text may be tagged as requiring changes.

The visual object part may be fed to the DNN which may be trained on reliable sources of multiple views of different locations/images to classify the input video frames and object as real or fake. The DNN may employ information retrieval, NLP, and knowledge graph analysis to evaluate the veracity of claims. A dataset of multiple views of different locations/images/videos that are authentic may be gathered from reliable sources. Fake labels for the same images may be used for better prediction. These labels may be obtained through manual annotation or existing datasets with labeled real or fake videos. The video may be converted into frames, resizing the frames and normalizing pixel values. The CNN may be used for video analysis. The CNN may be trained using the labeled dataset, feeding frames as input to the CNN and adjusting internal weights to minimize the classification error. The training process may involve backpropagation and gradient descent. The trained model may then be validated using a separate validation dataset to assess performance. For example, the model's accuracy, precision, recall, F1-score, and other metrics may measure the model's ability to distinguish between real and fake videos. If the model predicts the visual component as fake the model may identify the bounding box coordinates of the fake objects in the video.

Then, at 208, the factcheck streaming program 150 identifies the at least one factually inaccurate item of content in the one or more items of content. It may be appreciated that in embodiments of the present invention, a factually inaccurate item of content may include any item of content that is not classified as a factually accurate item of content. Examples of the factually inaccurate item of content may include, but are not limited to, factually inaccurate spoken content, factually inaccurate textual content (i.e., not spoken), and/or factually inaccurate visual objects. For example, the factually inaccurate spoken content may be "This palace was built by Emperor A," where the palace was in fact built by Emperor B. In another example, the factually inaccurate textual content may be text on a poster in the VR collaboration indicating the palace was built by Emperor A where the palace was in fact built by Emperor B. In a further example, the factually inaccurate visual object may be the palace itself, since the palace was not built by Emperor A.

According to at least one embodiment, in response to determining the at least one factually inaccurate item of content is the spoken content, a color of a portion of text corresponding to the at least one factually inaccurate item of content may be adapted in the transcript of the VR collaboration. As described above with respect to step 206, the spoken content in the VR collaboration may be transcribed. The color of the portion of text corresponding to the at least one factually inaccurate spoken content may be changed by highlighting that factually inaccurate portion of text. For example, where the factually inaccurate spoken content is "This palace was built by Emperor A," the sentence "This palace was built by Emperor A" may be highlighted.

Next, at 210, the factcheck streaming program 150 determines whether the at least one factually inaccurate item of content is able to be replaced with the at least one factually accurate item of content. As described above with respect to step 206, the factcheck streaming program 150 may have access to a variety of sources (e.g., databases, such as remote database 130). These sources may or may not contain factually accurate information for the factually inaccurate information. For example, where a participant in the VR collaboration says or a poster in the VR collaboration reads "This palace was built by Emperor A," the factcheck streaming program 150 may search the databases for the factually accurate information. If the factually accurate information (e.g., the palace being built by Emperor B) exists in one or more of the databases, the factcheck streaming program 150 may determine the at least one factually inaccurate item of content is able to be replaced with the at least one factually accurate item of content. However, if the factually accurate information does not exist in one or more of the databases, the factcheck streaming program 150 may determine the at least one factually inaccurate item of content is not able to be replaced with the at least one factually accurate item of content. Additionally, the factcheck streaming program 150 may search the databases for a factually accurate visual object. For example, where the palace was built by Emperor B, but the image of the palace is factually inaccurate, the factcheck streaming program 150 may search the databases for a palace built by Emperor B. If the palace built by Emperor B exists in one or more of the databases, the factcheck streaming program 150 may determine the at least one factually inaccurate item of content is able to be replaced with the at least one factually accurate item of content.

In response to determining the at least one factually inaccurate item of content is not able to be replaced (step 210, "No" branch), the VR factcheck streaming process 200 proceeds to step 212 to remove the at least one factually inaccurate item of content from the VR collaboration. In response to determining the at least one factually inaccurate item of content is able to be replaced (step 210, "Yes" branch), the VR factcheck streaming process 200 proceeds to step 214 to generate the at least one factually accurate item of content.

Then, at 212, the factcheck streaming program 150 removes, by the pre-trained GAN model, the at least one factually inaccurate item of content from the VR collaboration. The pre-trained GAN model is described in further detail below with respect to step 214. For example, where a participant in the VR collaboration says or a poster in the VR collaboration reads "This palace was built by Emperor A," and where this statement is factually inaccurate, the factually inaccurate spoken content "This palace was built by Emperor A" may be removed and a poster with the factually inaccurate textual content reading "This palace was built by Emperor A" may also be removed. Additionally, the factually inaccurate visual object may also be removed from the VR collaboration. For example, where the palace was in fact built by Emperor B, but the palace built by Emperor B is not in one or more of the databases, the palace may be removed from the VR collaboration.

Next, at 214, the factcheck streaming program 150 generates, by the pre-trained GAN model, the at least one factually accurate item of content. The factually inaccurate spoken content, the factually inaccurate textual content, and the factually inaccurate visual objects may be fed to the pre-trained GAN, which may be a conditional GAN (cGAN). The GAN may include a generator and a discriminator. In any GAN, the goal of the GAN generator is to trick the GAN discriminator into classifying artificially generated (i.e., fake) images as real. The GAN may generate new data that resembles a training data set. The GAN may generate video frames conditioned on original authentic data when that data is available in one or more of the databases. In the context of generating video and audio, the generator takes random noise as input and may transform the random noise into video and audio samples. The generator may include a CNN and an RNN to model the spatial and temporal aspects of the data. The at least one factually inaccurate item of content may be fed to the GAN generator along with factually accurate items of content so that the GAN generator can regenerate factually accurate items of content. The output of the GAN generator may be fed to the GAN discriminator. The GAN discriminator may then output a number between 0 and 1, where 0 indicates the GAN discriminator classified the generated video and audio as fake and 1 indicates the GAN discriminator classified the generated video and audio as real. For example, the GAN generator may generate a palace built by Emperor B, which may be fed to the GAN discriminator. Continuing the example, where the GAN discriminator outputs a number of 0.9, the GAN discriminator believes that the generated image is real.

The GAN generator and the GAN discriminator are trained in an adversarial manner, where the GAN generator generates synthetic video and audio samples using random noise as input, and the GAN discriminator provides probability scores for the real and generated samples. The GAN generator's objective is to generate samples that fool the GAN discriminator, and the GAN discriminator's objective is to accurately classify the samples as real or fake. The GAN generator and the GAN discriminator may be updated iteratively through backpropagation and gradient descent to optimize their respective objectives. The GAN generator loss is based on the GAN discriminator's output probability scores for the generated samples, and the GAN discriminator loss is based on the difference between its predictions for real and generated samples. The adversarial training process leads to the synthesis of high quality video and audio that resemble the training data.

Then, at 216, the factcheck streaming program 150 replaces the at least one factually inaccurate item of content with the generated at least one factually accurate item of content in the VR collaboration. The pre-trained GAN may identify the one or more frames of the video containing the at least one factually inaccurate item of content and replace those frames with the at least one factually accurate item of content. For example, where the factually inaccurate spoken content is "The palace was built by Emperor A," the pre-trained GAN may replace the audio "The palace was built by Emperor A" with the correct audio "The palace was built by Emperor B." Continuing the example, where the factually inaccurate textual content is "The palace was built by Emperor A" in a poster, the pre-trained GAN may replace the text "The palace was built by Emperor A" with the correct text "The palace was built by Emperor B." Continuing the example, the pre-trained GAN may replace a factually inaccurate image of the palace with a factually accurate image of the palace.

According to at least one embodiment, replacing the at least one factually inaccurate item of content may include adapting a gesture of an avatar in the VR collaboration in response to determining the gesture acknowledges the at least one factually inaccurate item of content. For example, where an avatar of a participant gives a thumbs up to a factually inaccurate statement, the thumbs up may be replaced with a thumbs down to indicate to the user that the statement is factually inaccurate.

Referring now to FIG. 3, an exemplary diagram 300 depicting a first VR collaboration 304 and a second VR collaboration 312 is shown according to at least one embodiment. In the diagram 300, a first user 302 may be attending the first VR collaboration 304, which may be a business meeting. In the first VR collaboration 304, a first poster 306 may contain factually inaccurate content. The factcheck streaming program 150 may search the databases for factually accurate content. However, the factually accurate content may not be available. In this embodiment, since the factually accurate content is not available, the first poster 306 may be removed from the first VR collaboration 304. A second poster 308 may also contain factually inaccurate content. The factcheck streaming program 150 may be able to find the factually accurate item of content in one of the databases. Thus, in this embodiment, the factually accurate item of content may replace the factually inaccurate item of content in the second poster 308.

A second user 310 may be attending the second VR collaboration 312, which may be a video game. In the context of the video game, the second user 310 may not find it necessary to prevent the propagation of false information. Thus, in the second VR collaboration 312, the second user 310 may not subscribe to the cloud-hosted factcheck service, and no action may be performed.

It may be appreciated that FIGS. 2 and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of factcheck streaming in a virtual reality (VR) collaboration, the method comprising:
receiving a video of a VR collaboration and one or more inputs from a user relating to the video;
identifying a pre-determined boundary of the VR collaboration based on the one or more inputs;
executing a factcheck of one or more items of content within the pre-determined boundary;
identifying at least one factually inaccurate item of content in the one or more items of content;
determining whether the at least one factually inaccurate item of content is able to be replaced with at least one factually accurate item of content; and
in response to determining the at least one factually inaccurate item of content is able to be replaced:
generating, by a pre-trained generative adversarial network (GAN) model, the at least one factually accurate item of content; and
replacing the at least one factually inaccurate item of content with the generated at least one factually accurate item of content in the VR collaboration.

2. The computer-based method of claim 1, further comprising:
in response to determining the at least one factually inaccurate item of content is not able to be replaced:
removing, by the pre-trained GAN model, the at least one factually inaccurate item of content from the VR collaboration.

3. The computer-based method of claim 2, wherein identifying the pre-determined boundary of the VR collaboration further comprises:
identifying one or more types of content to factcheck in the VR collaboration based on the one or more inputs.

4. The computer-based method of claim 2, wherein identifying the at least one factually inaccurate item of content further comprises:
in response to determining the at least one factually inaccurate item of content is spoken content, adapting a color of a portion of text corresponding to the at least one factually inaccurate item of content in a transcript of the VR collaboration.

5. The computer-based method of claim 2, wherein replacing the at least one factually inaccurate item of content further comprises:
adapting a gesture of an avatar in the VR collaboration in response to determining the gesture acknowledges the at least one factually inaccurate item of content.

6. The computer-based method of claim 2, wherein executing the factcheck of the one or more items of content further comprises:

splitting the video of the VR collaboration into an audio part and a visual part, wherein the visual part is further split into a non-spoken text part and a visual object part, and wherein the factcheck is executed on the audio part and the visual part separately.

7. The computer-based method of claim 6, wherein the factcheck is executed on a frame-by-frame basis.

8. A computer system, the computer system comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
receiving a video of a VR collaboration and one or more inputs from a user relating to the video;
identifying a pre-determined boundary of the VR collaboration based on the one or more inputs;
executing a factcheck of one or more items of content within the pre-determined boundary;
identifying at least one factually inaccurate item of content in the one or more items of content;
determining whether the at least one factually inaccurate item of content is able to be replaced with at least one factually accurate item of content; and
in response to determining the at least one factually inaccurate item of content is able to be replaced:
generating, by a pre-trained GAN model, the at least one factually accurate item of content; and
replacing the at least one factually inaccurate item of content with the generated at least one factually accurate item of content in the VR collaboration.

9. The computer system of claim 8, the method further comprising:
in response to determining the at least one factually inaccurate item of content is not able to be replaced:
removing, by the pre-trained GAN model, the at least one factually inaccurate item of content from the VR collaboration.

10. The computer system of claim 9, wherein identifying the pre-determined boundary of the VR collaboration further comprises:
identifying one or more types of content to factcheck in the VR collaboration based on the one or more inputs.

11. The computer system of claim 9, wherein identifying the at least one factually inaccurate item of content further comprises:
in response to determining the at least one factually inaccurate item of content is spoken content, adapting a color of a portion of text corresponding to the at least one factually inaccurate item of content in a transcript of the VR collaboration.

12. The computer system of claim 9, wherein replacing the at least one factually inaccurate item of content further comprises:
adapting a gesture of an avatar in the VR collaboration in response to determining the gesture acknowledges the at least one factually inaccurate item of content.

13. The computer system of claim 9, wherein executing the factcheck of the one or more items of content further comprises:
splitting the video of the VR collaboration into an audio part and a visual part, wherein the visual part is further split into a non-spoken text part and a visual object part, and wherein the factcheck is executed on the audio part and the visual part separately.

14. The computer system of claim 13, wherein the factcheck is executed on a frame-by-frame basis.

15. A computer program product, the computer program product comprising:
one or more computer-readable tangible storage medium and program instructions stored on at least one of the one or more computer-readable tangible storage medium, the program instructions executable by a processor capable of performing a method, the method comprising:
receiving a video of a VR collaboration and one or more inputs from a user relating to the video;
identifying a pre-determined boundary of the VR collaboration based on the one or more inputs;
executing a factcheck of one or more items of content within the pre-determined boundary;
identifying at least one factually inaccurate item of content in the one or more items of content;
determining whether the at least one factually inaccurate item of content is able to be replaced with at least one factually accurate item of content; and
in response to determining the at least one factually inaccurate item of content is able to be replaced:
generating, by a pre-trained GAN model, the at least one factually accurate item of content; and
replacing the at least one factually inaccurate item of content with the generated at least one factually accurate item of content in the VR collaboration.

16. The computer program product of claim 15, the method further comprising:
in response to determining the at least one factually inaccurate item of content is not able to be replaced:
removing, by the pre-trained GAN model, the at least one factually inaccurate item of content from the VR collaboration.

17. The computer program product of claim 16, wherein identifying the pre-determined boundary of the VR collaboration further comprises:
identifying one or more types of content to factcheck in the VR collaboration based on the one or more inputs.

18. The computer program product of claim 16, wherein identifying the at least one factually inaccurate item of content further comprises:
in response to determining the at least one factually inaccurate item of content is spoken content, adapting a color of a portion of text corresponding to the at least one factually inaccurate item of content in a transcript of the VR collaboration.

19. The computer program product of claim 16, wherein replacing the at least one factually inaccurate item of content further comprises:
adapting a gesture of an avatar in the VR collaboration in response to determining the gesture acknowledges the at least one factually inaccurate item of content.

20. The computer program product of claim 16, wherein executing the factcheck of the one or more items of content further comprises:
splitting the video of the VR collaboration into an audio part and a visual part, wherein the visual part is further split into a non-spoken text part and a visual object part, and wherein the factcheck is executed on the audio part and the visual part separately.

* * * * *